US012481459B2

(12) United States Patent
Hughes et al.

(10) Patent No.: US 12,481,459 B2
(45) Date of Patent: Nov. 25, 2025

(54) DEVICES AND METHODS FOR DETERMINISTIC INTERLEAVING OF DATA FROM MULTIPLE HOSTS CONNECTED TO A SINGLE PORT

(71) Applicant: SK Hynix NAND Product Solutions Corp., Rancho Cordova, CA (US)

(72) Inventors: Jonathan Hughes, Longmont, CO (US); Anilmurali Bhaviri, Longmont, CO (US); Muhammad Mohsin Awan, Erie, CO (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 182 days.

(21) Appl. No.: 18/540,605

(22) Filed: Dec. 14, 2023

(65) Prior Publication Data

US 2025/0199719 A1    Jun. 19, 2025

(51) Int. Cl.
*G06F 3/06*  (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

| 7,515,584 | B2 * | 4/2009 | Subramanian | .......... H04L 49/90 711/170 |
| 9,996,262 | B1 * | 6/2018 | Nemawarkar | ........ G06F 3/0673 |
| 11,507,301 | B2 | 11/2022 | Norman | |
| 11,755,476 | B2 | 9/2023 | Jeong et al. | |
| 2003/0142665 | A1 * | 7/2003 | Van Wageningen | ........................ H04L 49/254 370/386 |
| 2006/0230110 | A1 * | 10/2006 | VanHarlingen | ....... H04L 67/125 709/205 |
| 2013/0166797 | A1 * | 6/2013 | Komikado | ............ G06F 3/0689 710/74 |
| 2013/0198416 | A1 * | 8/2013 | Zhu | ........................ G06F 3/0659 710/6 |
| 2014/0351456 | A1 * | 11/2014 | Sharifie | ................. G06F 3/0685 710/5 |
| 2018/0322011 | A1 | 11/2018 | Batcheller et al. | |
| 2019/0266096 | A1 * | 8/2019 | Lee | .......................... G06F 3/061 |

(Continued)

*Primary Examiner* — Eric T Loonan
(74) *Attorney, Agent, or Firm* — Haley Guiliano LLP (57) ABSTRACT

A device and related method, the device including a port, memory circuitry, and processing circuitry which is coupled to the port and to the memory circuitry. The processing circuitry receives multiple commands through the port, wherein the multiple commands are from at least two hosts using an interposer and wherein each command of the multiple commands includes a respective memory address and a respective port identification (ID). The processing circuitry segments each of the received commands into multiple segments, each segment being of a predetermined transfer size. The processing circuitry also transmits each segment of each command to a respective data structure instantiation corresponding to the port ID of the respective received command and performs data transfer for each segment of the multiple segments by accessing the memory circuitry at each respective memory address associated with each segment.

22 Claims, 5 Drawing Sheets

(56) References Cited

U.S. PATENT DOCUMENTS

| | | | |
|---|---|---|---|
| 2019/0278523 A1* | 9/2019 | Benisty | G06F 3/0658 |
| 2019/0294566 A1 | 9/2019 | Park et al. | |
| 2020/0065140 A1* | 2/2020 | Wu | G06F 9/4881 |
| 2020/0104056 A1* | 4/2020 | Benisty | G06F 3/0688 |
| 2021/0064289 A1* | 3/2021 | Kanno | G06F 3/0604 |
| 2021/0240393 A1* | 8/2021 | Jo | G06F 3/0679 |
| 2021/0303206 A1* | 9/2021 | Saxena | G06F 3/0604 |
| 2022/0326888 A1 | 10/2022 | Matsumoto | |

* cited by examiner

DEVICES AND METHODS FOR DETERMINISTIC INTERLEAVING OF DATA FROM MULTIPLE HOSTS CONNECTED TO A SINGLE PORT

TECHNICAL FIELD

The present disclosure is directed to devices and methods for managing commands from multiple hosts via a single port of the device.

SUMMARY

In accordance with the present disclosure, devices and methods are provided for interleaving and processing commands from multiple hosts via a single port of a device (e.g., a storage device) to access memory circuitry. The device (e.g., a solid-state drive (SSD) device) includes memory circuitry, which may include memory blocks with pages or super pages of memory. The device and method disclosed herein may use firmware of the device along with processing circuitry to perform the interleaving and processing of commands received from multiple hosts. The interleaving of the received commands provides a command workload balancing which improves the link efficiency of the bus which couples the hosts to the single port of the device. An interposer may be used between the port of the device and the hosts in order to provide support from at least two ports on the host side of the interposer to a single port on the device side of the interposer. In addition, the interleaving and processing of the commands by the device disclosed herein reduces the memory and processing overhead of the interposer, which minimizes the command data path and associated latency within the interposer. The device and methods disclosed herein balance the access to memory circuitry of the device by each of the hosts. The commands may include any one or more data transfer request (e.g., read or write requests), such as direct memory access (DMA) data transfers.

The device (e.g., SSD device) may include processing circuitry, which receives a plurality of commands through the single port of the device. In some embodiments, each command of the plurality of commands originates from one of at least two hosts using an interposer. The interposer is used to communicatively couple multiple hosts to a single port of the device. In some embodiments, each command of the plurality of commands includes a respective memory address and a respective port identification (ID). The port ID included within each respective command corresponds to one respective host of the at least two hosts from which the respective command originates. Once the processing circuitry receives the plurality of commands, the processing circuitry then segments each of the received commands into a respective plurality of segments, each segment being of a predetermined transfer size. In some embodiments, the predetermined transfer size of each segment is no smaller than a maximum packet size (MPS) or the smallest transfer size that the device supports. The processing circuitry then transmits each segment of each plurality of segments to a respective data structure instantiation which corresponds to the port ID of the respective received command. In some embodiments, there is a respective data structure instantiation for each respective host communicatively coupled to the device. Each data structure instantiation is configured to temporarily store data transfer requests (e.g., direct memory access (DMA) requests), each data transfer request corresponding to a segment of a plurality of segments. The processing circuitry also performs data transfers for each respective segment of the plurality of segments by accessing memory of the device at each respective memory address associated with each respective segment. The processing circuitry is to perform data transfers for segments that correspond to data transfer requests in one respective data structure instantiation at a given time.

In some embodiments, the device (e.g., a storage device) is provided with memory circuitry and processing circuitry that are communicatively coupled to each other. In some embodiments, the processing circuitry includes (a) a processor to execute instructions, providing general processing capabilities for the device, and (b) a memory controller to process the commands to access memory circuitry without regard to the processor. In some embodiments, the processing circuitry receives commands from multiple hosts to be processed by the memory controller, each command including a destination memory address which corresponds to a memory address within memory circuitry. In some embodiments, the command is a write command, which includes host data which is to be stored at the destination memory address within memory circuitry.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, and/or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

DETAILED DESCRIPTION

In accordance with the present disclosure, devices and methods are provided for interleaving and processing commands from multiple hosts via a single port of a device (e.g., a storage device). The device (e.g., SSD device) may include processing circuitry, which receives a plurality of commands through the single port of the device. In some embodiments, each command of the plurality of commands originates from one of at least two hosts using an interposer. The interposer is used to communicatively couple multiple hosts to a single port of the device. In some embodiments, the interposer includes multiple submission queues, each submission queue corresponding to a respective host. In some embodiments, each command of the plurality of commands includes a respective memory address and a respective port identification (ID). The memory address included in each respective command corresponds to a memory address of memory circuitry of the device at which the processing circuitry accesses (e.g., reads from and writes to). The port ID included within each respective command corresponds to one respective host of the at least two hosts from which the respective command originates.

Once the processing circuitry receives the plurality of commands, the processing circuitry then segments each of the received commands into a respective plurality of segments, each segment being of a predetermined transfer size. In some embodiments, the predetermined transfer size of each segment is no smaller than a maximum packet size (MPS) or the smallest transfer size that the device supports. In some embodiments, the MPS and smallest transfer size are defined by the buses or interfaces used to connect the device to the multiple hosts. The processing circuitry then transmits each segment of each plurality of segments to a respective data structure instantiation which corresponds to the port ID of the respective received command. In some embodiments, each respective data structure instantiation is a mailbox (e.g., a direct memory access (DMA) mailbox). In some embodiments, there is a respective data structure instantiation for each respective host communicatively coupled to the device. Each data structure instantiation is configured to temporarily store data transfer requests (e.g., DMA requests), each data transfer request corresponding to a segment of a plurality of segments. In some embodiments, each data transfer request stored in a respective data structure instantiation originates from a respective host among the multiple hosts coupled to the single port. The processing circuitry also performs data transfers for each respective segment of the plurality of segments by accessing memory of the device at each respective memory address associated with each respective segment.

The processing circuitry is to perform data transfers for segments that correspond to data transfer requests in one respective data structure instantiation at a given time. In some embodiments, the processing circuitry performs data transfers for a first subset of segments of a first command by accessing the memory circuitry at each respective memory address associated with each respective segment of the first subset of segments, and then performs data transfers for a second subset of segments of a second command by accessing the memory circuitry at each respective memory address associated with each respective segment of the second subset of segments. In some embodiments, each of the first subset of segments and the second subset of segments includes at least one segment from their respective commands. In addition, each of the first command and the second command may include different port IDs, indicating that the first command and the second command originate from different hosts. This process enables the interleaving of data transfers for segments of commands from different hosts therefore improving the fairness of each host when accessing the memory of the device and improving the link efficiency of the bus which couples an interposer to the single port of the device.

For purposes of brevity and clarity, the features of the disclosure described herein are in the context of a device (e.g., an SSD device) having processing circuitry and memory circuitry. However, the principles of the present disclosure may be applied to any other suitable context in which interleaving and processing commands from multiple hosts via a single port of device to access memory circuitry. The device may include processing circuitry and memory circuitry, which are communicatively coupled to each other by network buses or interfaces. In some embodiments, the processing circuitry receives commands from multiple hosts through an interposer. In some embodiments, the interposer allows for multiple hosts to be communicatively coupled to a single port of the device. In some embodiments, the commands are sent from any of the hosts to the device via a network bus or interface.

In particular, the present disclosure provides devices and methods that provide improved network link efficiency between the device and the multiple hosts by interleaving and processing commands which access the memory circuitry of the device. This improves the overall performance and bandwidth of the device while the processing circuitry executes instructions and processes commands for accessing memory circuitry.

In some embodiments, the processing circuitry includes a processor and a memory controller. The memory controller may include a data transfer engine and a respective data structure instantiation corresponding to a respective host from which commands originate, each data structure instantiation (e.g., a DMA mailbox) is configured to temporarily store data transfer requests until the data transfer engine transmits the data transfer requests to the memory circuitry. In some embodiments, the processor of the processing circuitry may be a highly parallelized processor capable of handling high bandwidths of incoming instructions quickly (e.g., by starting simultaneous processing of instructions before completion of previously received instructions). The processor is to concurrently and independently execute instructions with respect to the memory controller processing command from the hosts.

The memory circuitry of the device may hereinafter be referred to as the memory of the device. In some embodiments, the memory of the device disclosed herein may contain any of the following memory densities: single-level cells (SLCs), multi-level cells (MLCs), triple-level cells (TLCs), quad-level cells (QLCs), penta-level cells (PLCs), and any suitable memory density that is greater than five bits per memory cell.

In some embodiments, the device and methods of the present disclosure may refer to a storage device (e.g., an SSD device) with a single port, which is communicatively coupled to multiple hosts (e.g., host devices) by a network bus or interface. In some embodiments, the hosts are coupled to the single port of the device through an interposer, which may include multiple host-side ports to receive and transmit data to and from each host and a single device-side port to transmit and receive data to and from the device.

An SSD is a data storage device that uses integrated circuit assemblies as memory to store data persistently. SSDs have no moving mechanical components, and this feature distinguishes SSDs from traditional electromechanical magnetic disks, such as hard disk drives (HDDs) or floppy disks, which contain spinning disks and movable read/write heads. Compared to electromechanical disks, SSDs are typically more resistant to physical shock, run silently, have lower access time, and less latency.

Many types of SSDs use NAND-based flash memory which retains data without power and includes a type of non-volatile storage technology. Quality of Service (QOS) of an SSD may be related to the predictability of low latency and consistency of high input/output operations per second (IOPS) while servicing read/write input/output (I/O) workloads. This means that the latency or the I/O command completion time needs to be within a specified range without having unexpected outliers. Throughput or I/O rate may also need to be tightly regulated without causing sudden drops in performance level.

The subject matter of this disclosure may be better understood by reference to FIGS. 1-5.

Figure 1:
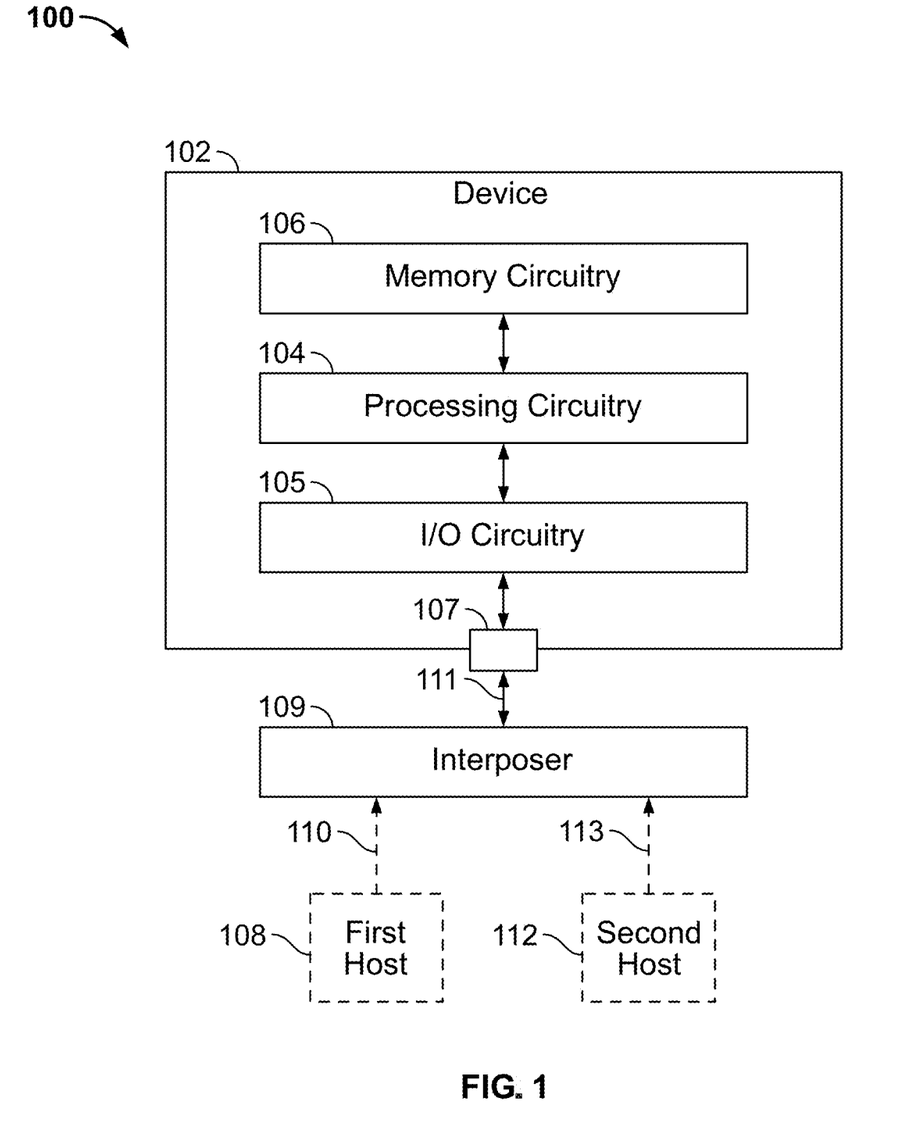
FIG. 1 shows an illustrative diagram of a system that includes two hosts and a device with processing circuitry, I/O circuitry, and memory circuitry, in accordance with some embodiments of the present disclosure.

FIG. 1 shows an illustrative diagram of a system 100 that includes two hosts (e.g., first host 108 and second host 112) and a device 102 with processing circuitry 104, I/O circuitry 105, and memory circuitry 106, in accordance with some embodiments of the present disclosure. In some embodiments, device 102 may be a storage device such as a solid-state storage device (e.g., an SSD device). In some embodiments, processing circuitry 104 may include a processor or any suitable processing unit. In some embodiments, memory circuitry 106 may include non-volatile memory. It will be understood that the embodiments of the present disclosure are not limited to SSDs. For example, in some embodiments, device 102 may include a hard disk drive (HDD) device in addition to or in place of an SSD. In some embodiments, I/O circuitry 105 includes temporary memory (e.g., cache or any suitable volatile memory) to store received commands (e.g., first command 110 from first host 108 and second command 113 from second host 112) via port 107.

The processing circuitry 104 is configured to receive commands (e.g., first command 110 and second command 113) through port 107 of device 102. In some embodiments, each command (e.g., first command 110 and second command 113) of the plurality of commands originates from one of at least two hosts (e.g., first host 108 and second host 112) using interposer 109. Interposer 109 communicatively couples multiple hosts (e.g., first host 108 and second host 112) to port 107 of device 102. In some embodiments, each command (e.g., first command 110 and second command 113) includes a respective memory address and a respective port ID. The memory address included in each respective command corresponds to a memory address of memory circuitry 106 of device 102 at which the processing circuitry 104 accesses (e.g., reads from and writes to). The port ID included within each respective command corresponds to one respective host (e.g., first host 108 and second host 112) of the at least two hosts from which the respective command (e.g., first command 110 and second command 113) originates. Once processing circuitry 104 receives the plurality of commands (e.g., first command 110 and second command 113), processing circuitry 104 then segments each of the received commands into a respective plurality of segments, each segment being of a predetermined transfer size. In some embodiments, the predetermined transfer size of each segment is no smaller than a maximum packet size (MPS) or the smallest transfer size that device 102 supports. In some embodiments, the MPS and smallest transfer size are defined by bus 111 used to connect device 102 to the multiple hosts (e.g., first host 108 and second host 112). Processing circuitry 104 then transmits each segment of each plurality of segments to a respective data structure instantiation which corresponds to the port ID of the respective received command (e.g., first command 110 and second command 113). In some embodiments, each respective data structure instantiation is a mailbox (e.g., a direct memory access (DMA) mailbox). In some embodiments, there is a respective data structure instantiation for each respective host (e.g., first host 108 and second host 112) communicatively coupled to device 102. Each data structure instantiation is configured to temporarily store data transfer requests (e.g., DMA requests), each data transfer request corresponding to a segment of a plurality of segments. In some embodiments, each data transfer request stored in a respective data structure instantiation originates from a respective host among the multiple hosts coupled to port 107. Processing circuitry 104 also performs data transfers for each respective segment of the plurality of segments by accessing memory (e.g., memory circuitry 106) of device 102 at each respective memory address associated with each respective segment.

Processing circuitry 104 is to perform data transfers for segments that correspond to data transfer requests in one respective data structure instantiation at a given time. In some embodiments, processing circuitry 104 performs data transfers for a first subset of segments of first command 110 by accessing the memory circuitry 106 at each respective memory address associated with each respective segment of the first subset of segments, and then performs data transfers for a second subset of segments of second command 113 by accessing memory circuitry 106 at each respective memory address associated with each respective segment of the second subset of segments. In some embodiments, each of the first subset of segments and the second subset of segments includes at least one segment from their respective commands. In addition, each of the first command 110 and the second command 113 may include different port IDs, indicating that first command 110 and second command 113 originate from different hosts (e.g., first host 108 and second host 112). This process enables the interleaving of data transfers for segments of commands (e.g., first command 110 and second command 113) from different hosts (e.g., first host 108 and second host 112), therefore improving the fairness of each host when accessing circuitry memory 106 of device 102 and improving the link efficiency of bus 111 which couples interposer 109 to port 107 of device 102.

For purposes of brevity and clarity, the features of the disclosure described herein are in the context of a device (e.g., an SSD device) having processing circuitry and memory circuitry. However, the principles of the present disclosure may be applied to any other suitable context in which interleaving and processing commands from multiple hosts via a single port of device to access memory circuitry. The device may include processing circuitry and memory circuitry, which are communicatively coupled to each other by network buses or interfaces. In some embodiments, the processing circuitry receives commands from multiple hosts through an interposer. In some embodiments, the interposer allows for multiple hosts to be communicatively coupled to a single port of the device. In some embodiments, the commands are sent from any of the hosts to the device via a network bus or interface.

In some embodiments, interposer 109 includes multiple submission queues, each submission queue corresponding to a respective host. Each respective submission queue of interposer 109 is to store commands from a corresponding host. In some embodiments, the processing circuitry 104 fetches commands from the submission queues of interposer 109 in order to process each command. In some embodiments, the processing circuitry 104 fetches the commands from the submission queues in a round-robin manner, where one command is fetched from each submission queue at a time in a sequential fashion. This is at least one feature which ensures that each host (e.g., first host 108 and second host 112) has a fair amount of access to processing circuitry 104 when accessing memory circuitry 106. In some embodiments, the hosts (e.g., first host 108 and second host 112) may be performing two different applications.

Port 107 is an input/outport port which is configured to receive commands (e.g., first command 110 and second command 113) from multiple hosts (e.g., first host 108 and second host 112) on bus 111 and data from device 102 onto bus 111. In some embodiments, port 107 is communicatively coupled to I/O circuitry 105. Bus 111 may transport commands and data between port 107 and interposer 109. Bus 111 may transport commands and data using a Non-Volatile Memory Express (NVMe), Peripheral Component Interconnect Express (PCIe), or any other suitable network protocol.

Additionally, device 102 includes memory circuitry 106. Memory circuitry 106 may also be hereinafter referred to as memory of device 102. In some embodiments, memory circuitry 106 includes any one or more of a non-volatile memory, such as Phase Change Memory (PCM), a PCM and switch (PCMS), a Ferroelectric Random Access Memory (FeRAM), or a Ferroelectric Transistor Random Access Memory (FeTRAM), a Memristor, a Spin-Transfer Torque Random Access Memory (STT-RAM), and a Magnetoresistive Random Access Memory (MRAM), any other suitable memory, or any combination thereof. In some embodiments, memory circuitry 106 includes memory of a memory density, the memory density is any one of (a) single-level cell (SLC) memory density, (b) multi-level cell (MLC) memory density, (c) tri-level cell (TLC) memory density, (d) quad-level cell (QLC) memory density, (e) penta-level cell (PLC) memory density, or (f) a memory density of greater than 5 bits per memory cell. Processing circuitry 104 is communicatively coupled to memory circuitry 106 to store and access data in memory blocks or pages of memory circuitry 106. In some embodiments, a data bus interface is used to transport data transfer requests or data. In some embodiments, the data bus interface includes a data transfer request bus and a data interface. In some embodiments, memory circuitry 106 includes multiple memory die. In some embodiments, memory circuitry 106 includes multiple bands of memory, each band spanning across each memory die. In some embodiments, memory circuitry 106 may be accessed (e.g., read or written to) using direct memory access (DMA) by the processing circuitry. In such embodiments, the processing circuitry includes a processor to execute instructions and a memory controller (e.g., a DMA controller) to process and perform DMA transfers independent of the execution of instructions by the processor.

In some embodiments, device 102 also includes volatile memory, which may include any one or more volatile memory, such as Static Random Access Memory (SRAM). In some embodiments, volatile memory is configured to temporarily store data (e.g., first command 110 and second command 113) while processing circuitry 104 processes commands from the hosts (e.g., the first host 108 and the second host 112). In some embodiments, each of processing circuitry 104 and I/O circuitry 105 is communicatively coupled to volatile memory to store and access commands (first command 110 and second command 113) received from the hosts (e.g., first host 108 and second host 112) through the interposer 109. In some embodiments, a data bus interface is used to transport commands (e.g., first command 110 and second command 113) or command data from volatile memory to processing circuitry 104. In some embodiments, volatile memory is communicatively coupled to memory circuitry 106, the volatile memory configured to function as a cache or temporary memory storage for memory circuitry 106. In some embodiments, a data bus interface between memory circuitry 106 and volatile memory provides a network bus for accessing or writing data to or from memory circuitry 106.

In some embodiments, the processor or processing unit of processing circuitry 104 may include a hardware processor, a software processor (e.g., a processor emulated using a virtual machine), or any combination thereof. The processor may include any suitable software, hardware, or both for controlling memory circuitry 106 and processing circuitry 104 while performing instructions. In some embodiments, device 102 may further include a multi-core processor. In some embodiments, processing circuitry 104 includes a memory controller (e.g., direct memory access (DMA) controller), which may include any suitable software, hardware, or both for accessing memory circuitry 106 independent of the processor which executes instructions. Memory circuitry 106 may also include hardware elements for non-transitory storage of instructions, commands, or requests.

In some embodiments, device 102 may be a storage device (for example, SSD device) which may include one or more packages of memory dies (e.g., memory circuitry 106), where each die includes storage cells. In some embodiments, the storage cells are organized into pages or super pages, such that pages and super pages are organized into blocks. In some embodiments, each storage cell can store one or more bits of information.

For purposes of clarity and brevity, and not by way of limitation, the present disclosure is provided in the context of interleaving and processing commands (e.g., first command 110 and second command 113) from multiple hosts (e.g., first host 108 and second host 112) via a single port (e.g., port 107) of device 102 to access memory circuitry 106. The process of interleaving and processing commands (e.g., first command 110 and second command 113) from multiple hosts (e.g., first host 108 and second host 112) via a single port may be configured by any suitable software, hardware, or both for implementing such features and functionalities. The interleaving and processing of commands from multiple hosts through a single port of the device may be at least partially implemented in, for example, device 102 (e.g., as part of processing circuitry 104, or any other suitable device). For example, for a solid-state storage device (e.g., device 102), interleaving and processing commands from multiple hosts through a single port may be implemented in processing circuitry 104. The interleaving and processing of commands from multiple hosts through a single port may provide improved link efficiency of bus 111 between interposer 109 and device 102 through port 107. This improved link efficiency will also result in an improved performance speed of device 102 to process commands to access memory circuitry 106 while a processing circuitry concurrently executes instructions that are without any regard to the multiple hosts. In addition, the interleaving and processing of commands by device 102 may reduce the cost, memory overhead and processing overhead of the interposer or dongle (e.g., interposer 109) used to communicatively couple the hosts (e.g., first host 108 and second host 112) to port 107 of device 102.

Figure 2:
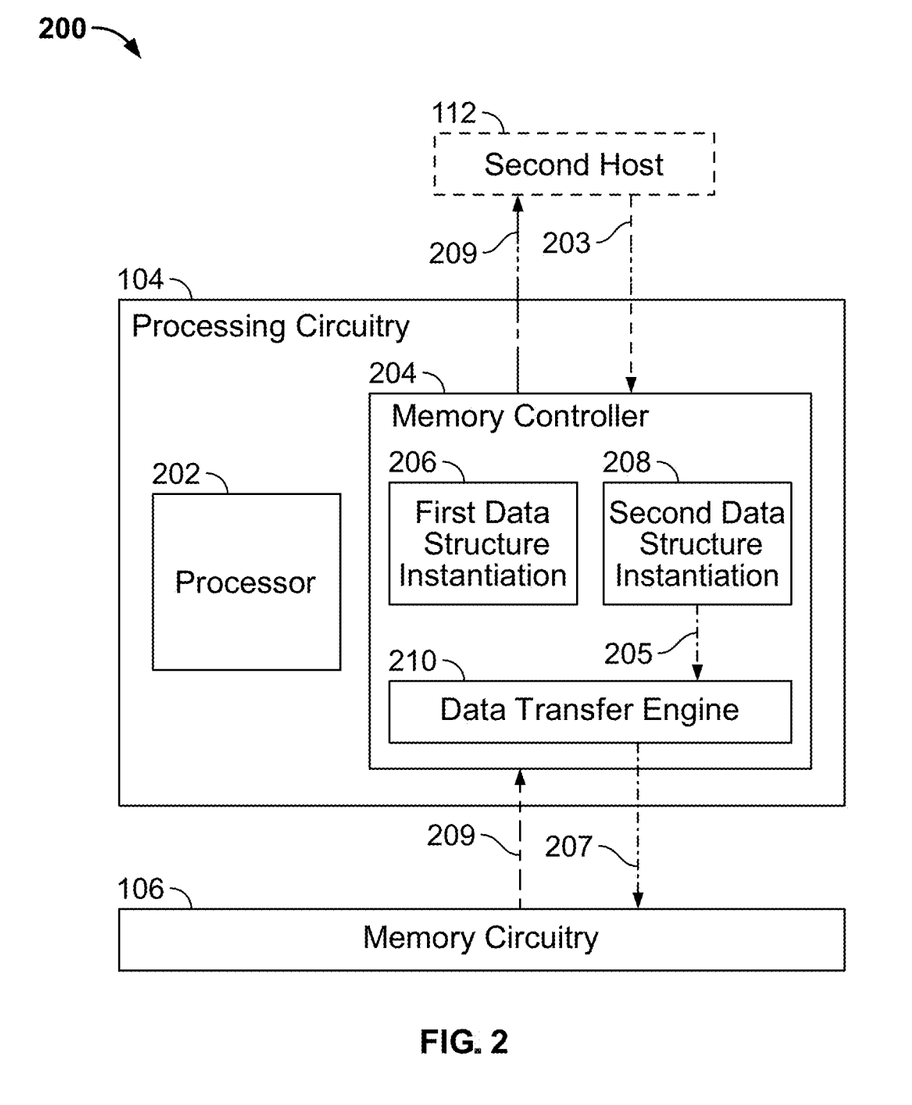
FIG. 2 shows an illustrative diagram of the processing circuitry of FIG. 1 processing an example command from a host, in accordance with some embodiments of the present disclosure.

FIG. 2 shows an illustrative diagram of the processing circuitry 104 of FIG. 1 processing an example read command 203 from second host 112, in accordance with some embodiments of the present disclosure. Processing circuitry 104 may include processor 202 and memory controller 204. While the processor 202 may execute instructions for the device (e.g., device 102) the memory controller 204 is configured to receive and process commands (e.g., read command 203 from second host 112). In some embodiments, memory controller 204 processes each command (e.g., read command) while processor 202 executes instructions, such that the hosts (e.g., first host 108 and second host 112) may access memory circuitry 106 while processor 202 executes instructions for device 102.

When processing the received commands (e.g., read command 203), memory controller 204 may segment each command into a respective plurality of segments. The memory controller 204 then stores a data transfer request (e.g., data transfer request 205) which corresponds to one segment of a respective plurality of segments to a data structure instantiation (e.g., first data structure instantiation 206 and second data structure instantiation 208). In some embodiments, each of the first data structure instantiation 206 and second data structure instantiation 208 is implemented in memory controller 204, however, each of the first data structure instantiation 206 and second data structure instantiation 208 may be implemented in processing circuitry 104. In some embodiments, first data structure instantiation 206 and second data structure instantiation 208 are mailboxes (e.g., DMA mailboxes) to temporarily store data transfer requests (e.g., data transfer request 205), such as DMA requests. The memory controller 204 stores the data transfer request for a respective segment of a respective command based on the port ID included within the respective command. Therefore, segments of commands which originate from the same host will be stored in the same data structure instantiation by memory controller 204. In some embodiments, there is one respective data structure instantiation (e.g., first data structure instantiation 206 and second data structure instantiation 208) for each host (e.g., first host 108 and second host 112) communicatively coupled to device 102.

For example, as shown in FIG. 2, read command 203 is transmitted from second host 112 and is received by memory controller 204 through interposer 109 and port 107 (not shown in FIG. 2). Memory controller 204 then segments read command 203 into a plurality of segments, and determines to which data structure instantiation (e.g., first data structure instantiation 206 and second data structure instantiation 208) the data transfer requests corresponding to the plurality of segments are to be stored. In some embodiments, memory controller 204 stores a subset of data transfer requests (e.g., data transfer request 205) in a data structure instantiation. In some embodiments, the subset of data transfer requests includes at least one data transfer request. Since the read command 203 is from second host 112, memory controller 204 will store the data transfer requests (e.g., data transfer request 205) in second data structure instantiation 208 based on the port ID associated with read command 203. Data transfer request 205 is one of many data transfer requests that correspond to segments of read command 203. In some embodiments, each data transfer request (e.g., data transfer request 205) includes a memory address at which to access memory circuitry 106. In some embodiments, if the respective data transfer request corresponds to a segment of a write command, the respective data transfer request may also include host data to store at the memory address of memory circuitry 106. Memory controller 204 may also include data transfer engine 210 (e.g., DMA engine) to perform the data transfer requests (e.g., data transfer request 205). As shown in FIG. 2 data transfer engine 210 performs data transfer request 205 by transmitting read request 207 to memory circuitry 106. When memory circuitry 106 receives read request 207, memory circuitry reads the data stored at the memory address of the memory circuitry 106 included in read request 207. Memory circuitry 106 then transmits read data 209, which corresponds to read request 207, to memory controller 204. Lastly, memory controller 204 receives read data 209 and transmits read data 209 to second host 112 on bus 111 through interposer 109 (bus 111 and interposer 109 not shown). In some embodiments, memory controller 204 is configured to perform data transfers from each of the data structure instantiations (e.g., first data structure instantiation 206 and second data structure instantiation 208) in a round-robin manner, such that the data transfer requests stored in each data structures instantiation are interleaved as they are transmitted to data transfer engine 210.

Figure 3:
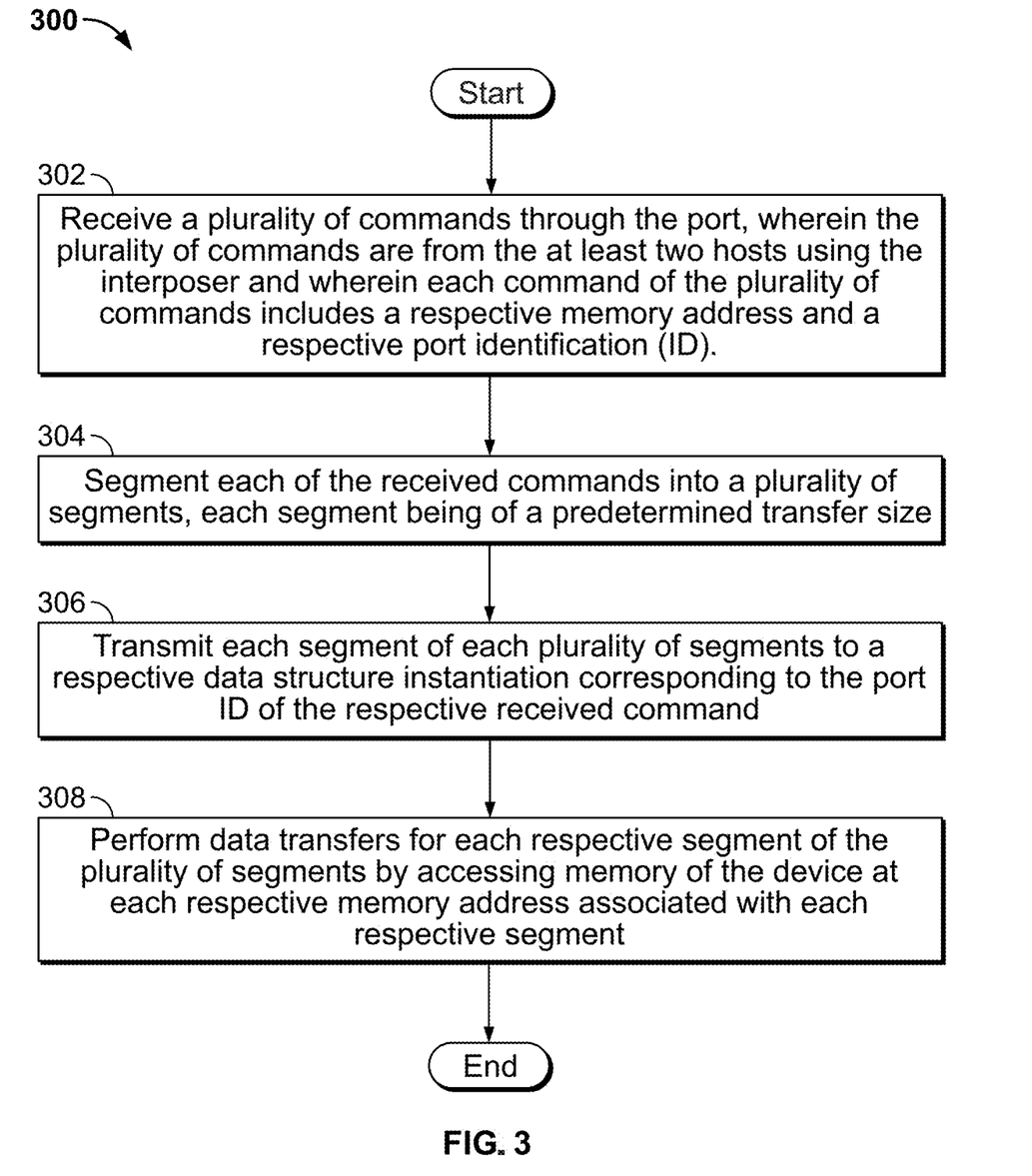
FIG. 3 shows a flowchart of illustrative steps of a process for performing data transfers on a device, in accordance with some embodiments of the present disclosure.

FIG. 3 shows a flowchart of illustrative steps of a process 300 for performing data transfers on a device, in accordance with some embodiments of the present disclosure. In some embodiments, the referenced system, device, processing circuitry, I/O circuitry, memory circuitry (e.g., memory of the device), port, first host, interposer, first command, bus, second host, second command, processor, memory controller, data transfers, first data structure instantiation, read request, second data structure instantiation, read data and data transfer engine may be implemented/represented as system 100, device 102, processing circuitry 104, I/O circuitry 105, memory circuitry 106, port 107, first host 108, interposer 109, first command 110, bus 111, second host 112, second command 113, processor 202, memory controller 204, data transfer request 205, first data structure instantiation 206, read request 207, second data structure instantiation 208, read data 209, and data transfer engine 210. In some embodiments, process 300 can be modified by, for example, having steps rearranged, changed, added, and/or removed.

At step 302, the processing circuitry receives a plurality of commands (e.g., write and read commands) through the port, wherein the plurality of commands are from at least two hosts (e.g., the first host and the second host) using the interposer and wherein each command of the plurality of commands includes a respective memory address and a respective port identification (ID). In some embodiments, each command of the plurality of commands originates from one of the at least two hosts using an interposer. In some embodiments, the interposer includes multiple submission queues, each submission queue corresponding to a respective host. In some embodiments, each command of the plurality of commands includes a respective memory address and a respective port identification (ID). The memory address included in each respective command corresponds to a memory address of the memory of the device at which the processing circuitry accesses (e.g., reads from and writes to). Once the processing circuitry receives the plurality of commands, the processing circuitry then segments each of the received commands into a respective plurality of segments, each segment being of a predetermined transfer size, at step 304.

At step 304, the processing circuitry segments each of the received commands into a plurality of segments, each segment being of a predetermined transfer size. In some embodiments, the predetermined transfer size of each segment is no smaller than a maximum packet size (MPS) or the smallest transfer size that the device supports. In some embodiments, the MPS and smallest transfer size are defined by the buses or interfaces used to connect the device to the multiple hosts. Once the processing circuitry segments each of the received commands into a plurality of segments, the processing circuitry then transmits each segment of each plurality of segments to a respective data structure instantiation which corresponds to the port ID of the respective received command, at step 306.

At step 306, the processing circuitry transmits each segment of each plurality of segments to a respective data structure instantiation corresponding to the port ID of the respective received command. In some embodiments, each respective data structure instantiation is a mailbox (e.g., a direct memory access (DMA) mailbox). In some embodiments, there is a respective data structure instantiation for each respective host communicatively coupled to the device. Each data structure instantiation is configured to temporarily store data transfer requests (e.g., DMA requests), each data transfer request corresponding to a segment of a plurality of segments. In some embodiments, each data transfer request stored in a respective data structure instantiation originates from a respective host among the multiple hosts coupled to the single port. The processing circuitry then performs data transfers for each respective segment of the plurality of segments by accessing memory of the device at each respective memory address associated with each respective segment, at step 308.

At step 308, the processing circuitry performs data transfers for each respective segment of the plurality of segments by accessing memory of the device at each respective memory address associated with each respective segment. The processing circuitry is to perform data transfers for segments that correspond to data transfer requests in one respective data structure instantiation at a given time. In some embodiments, the processing circuitry performs data transfers for a first subset of segments of a first command by accessing the memory of the device at each respective memory address associated with each respective segment of the first subset of segments, and then performs data transfers for a second subset of segments of a second command by accessing the memory of the device at each respective memory address associated with each respective segment of the second subset of segments. In some embodiments, each of the first subset of segments and the second subset of segments includes at least one segment from their respective commands. In addition, each of the first command and the second command may include different port IDs, indicating that the first command and the second command originate from different hosts.

Figure 4A:
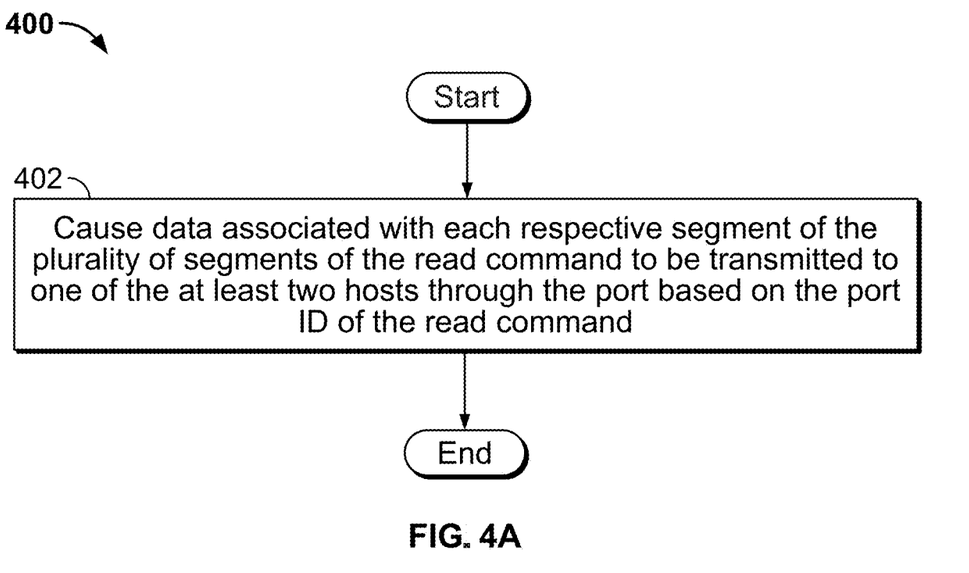
FIGS. 4A and 4B show flowcharts of illustrative steps of subprocesses for performing read commands and write commands received from a respective host, in accordance with some embodiments of the present disclosure.

FIG. 4A shows a flowchart of illustrative steps of subprocess 400 for performing read commands received from a respective host, in accordance with some embodiments of the present disclosure. In some embodiments, the referenced system, device, processing circuitry, I/O circuitry, memory circuitry, port, first host, interposer, first command, bus, second host, second command, processor, memory controller, data transfers, first data structure instantiation, read request, second data structure instantiation, read data and data transfer engine may be implemented/represented as system 100, device 102, processing circuitry 104, I/O circuitry 105, memory circuitry 106, port 107, first host 108, interposer 109, first command 110, bus 111, second host 112, second command 113, processor 202, memory controller 204, data transfer request 205, first data structure instantiation 206, read request 207, second data structure instantiation 208, read data 209, and data transfer engine 210. In some embodiments, subprocess process 400 can be modified by, for example, having steps rearranged, changed, added, and/or removed.

At step 402, the processing circuitry causes data associated with each respective segment of the plurality of segments of the read command to be transmitted to one of the at least two hosts through the port based on the port ID of the read command. Each segment of the plurality of segments of a read command includes a destination memory address which corresponds to a memory address of the memory of the device. When the processing circuitry performs a data transfer for a respective segment of the read command, data stored at the destination memory address of the respective segment is read by the processing circuitry. In some embodiments, the data read at the respective destination memory address is then transmitted from the single port of the device to the host based on the port ID of the command. In some embodiments, I/O circuitry is used to transmit the data read in for at least one segment of the command to the host from which the command was originally sent.

Figure 4B:
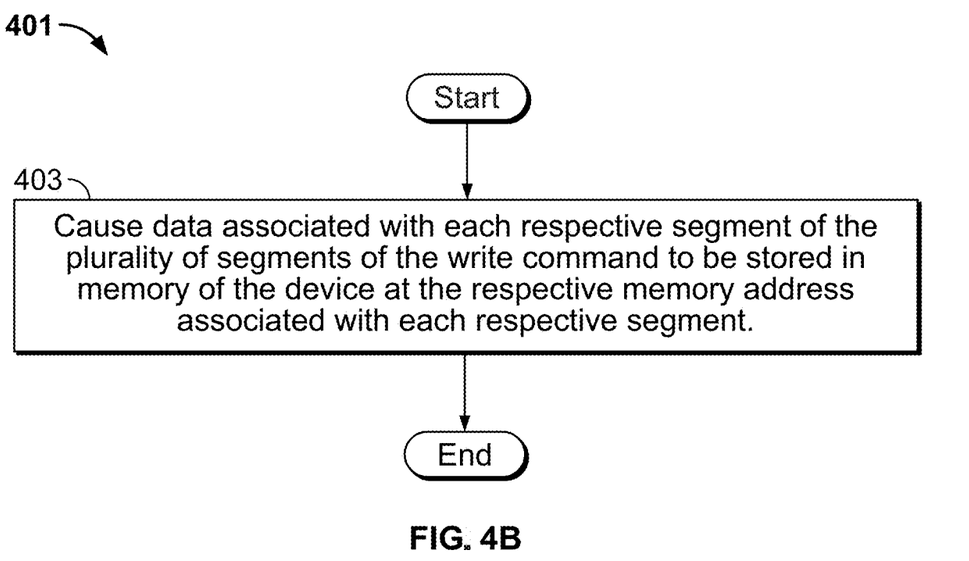

FIG. 4B shows a flowchart of illustrative steps of subprocess 401 for performing write commands received from a respective host, in accordance with some embodiments of the present disclosure. In some embodiments, the referenced system, device, processing circuitry, I/O circuitry, memory circuitry, port, first host, interposer, first command, bus, second host, second command, processor, memory controller, data transfers, first data structure instantiation, read request, second data structure instantiation, read data and data transfer engine may be implemented/represented as system 100, device 102, processing circuitry 104, I/O circuitry 105, memory circuitry 106, port 107, first host 108, interposer 109, first command 110, bus 111, second host 112, second command 113, processor 202, memory controller 204, data transfer request 205, first data structure instantiation 206, read request 207, second data structure instantiation 208, read data 209, and data transfer engine 210. In some embodiments, subprocess 401 can be modified by, for example, having steps rearranged, changed, added, and/or removed.

At step 403, the processing circuitry causes data associated with each respective segment of the plurality of segments of the write command to be stored in the memory of the device at the respective memory address associated with each respective segment. Each segment of the plurality of segments of a write command includes host data and destination memory address which corresponds to a memory address of the memory of the device. When the processing circuitry performs a data transfer for a respective segment of the write command, the host data associated with the respective segment of the write command is stored in the memory of the device at the destination memory address. In some embodiments, the host data overwrites data previously stored at the destination memory address. In some embodiments, the destination memory address at which the data transfer request of the segment is to be performed refers to a logical block address (LBA). When the processing circuitry performs the data transfer request of a write command, the processing circuitry may determine a physical address of the memory which may be mapped to the logical destination memory address of the data transfer request for the segment. In some embodiments, this logical-to-physical (L2P) mapping may be stored and maintained by a look-up table. Therefore, if a destination memory address of the read command matches one of the L2P mappings of the look-up table, the processing circuitry accesses the data stored at the physical memory address corresponding to the matched L2P mapping.

Figure 5:
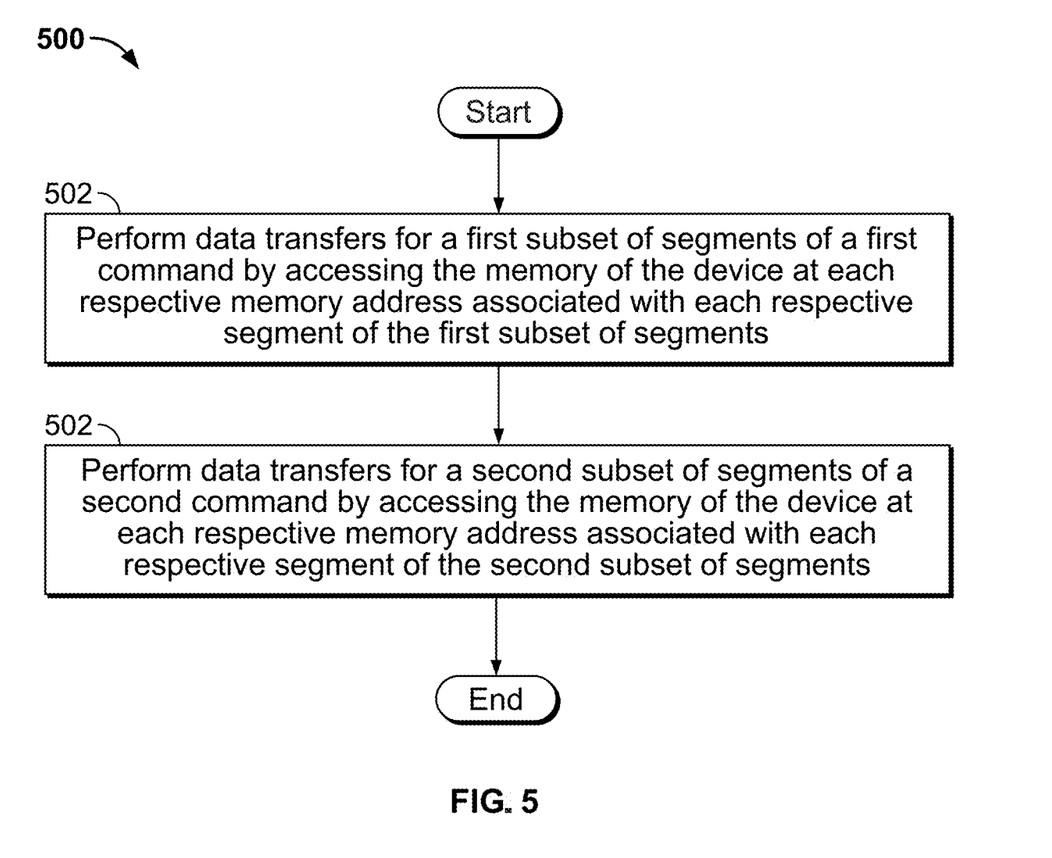
FIG. 5 shows a flowchart of illustrative steps of a subprocess for performing data transfers on a device by interleaving data transfers for commands from each of the respective hosts, in accordance with some embodiments of the present disclosure.

FIG. 5 shows a flowchart of illustrative steps of subprocess 500 for performing data transfers on a device by interleaving data transfers for commands from each of the respective hosts, in accordance with some embodiments of the present disclosure. In some embodiments, the referenced system, device, processing circuitry, I/O circuitry, memory circuitry, port, first host, interposer, first command, bus, second host, second command, processor, memory controller, data transfers, first data structure instantiation, read request, second data structure instantiation, read data and data transfer engine may be implemented/represented as system 100, device 102, processing circuitry 104, I/O circuitry 105, memory circuitry 106, port 107, first host 108, interposer 109, first command 110, bus 111, second host 112, second command 113, processor 202, memory controller 204, data transfer request 205, first data structure instantiation 206, read request 207, second data structure instantiation 208, read data 209, and data transfer engine 210. In some embodiments, subprocess 500 can be modified by, for example, having steps rearranged, changed, added, and/or removed.

At step 502, the processing circuitry performs data transfers for a first subset of segments of a first command by accessing the memory of the device at each respective memory address associated with each respective segment of the first subset of segments. In some embodiments, the first command includes a first port ID, indicating that the first command originates from the first host. In some embodiments, the first subset of segments includes at least one segment of the first command. In some embodiments, data transfer requests for the first subset of segments are temporarily stored in the first data structure instantiation (e.g., a DMA mailbox) before the processing circuitry performs the data transfers for the first subset of segments. The data transfer requests for the first subset of segments may include any one of read requests, write requests or any other suitable request to access the memory of the device. In some embodiments, the data transfer requests of the first subset of segments are the only data transfer requests stored in the first data structure instantiation at the time processing circuitry is to perform the data transfer requests. Once the processing circuitry performs data transfers for the first subset of segments of the first command, the processing circuitry may perform data transfers for a second subset of segments of a second command, at step 504.

At step 504, the processing circuitry performs data transfers for a second subset of segments of a second command by accessing the memory of the device at each respective memory address associated with each respective segment of the second subset of segments. In some embodiments, the second command includes a second port ID, indicating that the second command originates from the second host. In some embodiments, the second subset of segments includes at least one segment of the second command. In some embodiments, data transfer requests for the second subset of segments are temporarily stored in the second data structure instantiation (e.g., a DMA mailbox) before the processing circuitry performs the data transfers for the second subset of segments. The data transfer requests for the second subset of segments may include any one of read requests, write requests or any other suitable request to access the memory of the device. In some embodiments, the data transfer requests of the second subset of segments are the only data transfer requests stored in the second data structure instantiation at the time processing circuitry is to perform the data transfer requests.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments. Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A device, comprising:
a port coupled to a bus, to which at least two hosts are communicatively coupled using an interposer;
memory circuitry; and
processing circuitry, coupled to the port and to the memory circuitry, the processing circuitry to:
receive a plurality of commands through the port, wherein the plurality of commands are from the at least two hosts using the interposer and wherein each command of the plurality of commands comprises a respective memory address and a respective port identification (ID);

segment each of the received commands into a plurality of segments, each segment being of a predetermined transfer size;

transmit each segment of each plurality of segments to a respective data structure instantiation corresponding to the port ID of the respective received command; and perform data transfers for each respective segment of the plurality of segments by accessing the memory circuitry at each respective memory address associated with each respective segment.

2. The device of claim 1, wherein the respective data structure instantiations are respective memory mailboxes.

3. The device of claim 1, wherein at least one command of the plurality of commands is a read command and the processing circuitry is further to:

cause data associated with each respective segment of the plurality of segments of the read command to be transmitted to one of the at least two hosts through the port based on the port ID of the read command.

4. The device of claim 1, wherein at least one command of the plurality of commands is a write command and the processing circuitry is further to:

cause data associated with each respective segment of the plurality of segments of the write command to be stored in memory circuitry at the respective memory address associated with each respective segment.

5. The device of claim 1, wherein the predetermined transfer size is no smaller than a maximum packet size (MPS) and a smallest transfer size that the device supports.

6. The device of claim 1, wherein processing circuitry comprises:

a processor to execute instructions; and a memory controller to:

receive the plurality of commands through the port, wherein the plurality of commands are from the at least two hosts using the interposer and wherein each command of the plurality of commands comprises a respective memory address and a respective port identification (ID);

segment each of the received commands into a plurality of segments, each segment being of the predetermined transfer size;

transmit each segment of each plurality of segments to a respective data structure instantiation corresponding to the port ID of the respective received command; and perform data transfers for each respective segment of the plurality of segments by accessing the memory circuitry at each respective memory address associated with each respective segment.

7. The device of claim 6, wherein the memory controller is a direct memory access (DMA) controller.

8. The device of claim 1, wherein to receive the plurality of commands through the port the processing circuitry is to fetch each command of the plurality of commands through the bus from at least one submission queue of the interposer, wherein each of the at least one submission queue temporarily stores commands received from the at least two hosts.

9. The device of claim 1, wherein the respective port ID of each command of the plurality of commands corresponds to one of the at least two hosts.

10. The device of claim 1, wherein the processing circuitry is further to:

perform data transfers for a first subset of segments of a first command by accessing the memory circuitry at each respective memory address associated with each respective segment of the first subset of segments; and perform data transfers for a second subset of segments of a second command by accessing the memory circuitry at each respective memory address associated with each respective segment of the second subset of segments.

11. A method for performing data transfer on a device comprising a port coupled to a bus, to which at least two hosts are communicatively coupled using an interposer, the method comprising:

receiving, by processing circuitry of the device, a plurality of commands through the port, wherein the plurality of commands are from the at least two hosts using the interposer and wherein each command of the plurality of commands comprises a respective memory address and a respective port identification (ID);

segmenting, by the processing circuitry, each of the received commands into a plurality of segments, each segment being of a predetermined transfer size;

transmitting, by the processing circuitry, each segment of each plurality of segments to a respective data structure instantiation corresponding to the port ID of the respective received command; and performing, by the processing circuitry, data transfers for each respective segment of the plurality of segments by accessing memory of the device at each respective memory address associated with each respective segment.

12. The method of claim 11, wherein the respective data structure instantiations are respective memory mailboxes.

13. The method of claim 11, wherein at least one command of the plurality of commands is a read command and the method further comprises:

causing data associated with each respective segment of the plurality of segments of the read command to be transmitted to one of the at least two hosts through the port based on the port ID of the read command.

14. The method of claim 11, wherein at least one command of the plurality of commands is a write command and the method further comprises:

causing data associated with each respective segment of the plurality of segments of the write command to be stored in memory of the device at the respective memory address associated with each respective segment.

15. The method of claim 11, wherein the predetermined transfer size is no smaller than a maximum packet size (MPS) and a smallest transfer size that the device supports.

16. The method of claim 11, further comprising executing, by a processor of the processing circuitry, instructions.

17. The method of claim 11, wherein:

receiving the plurality of commands through the port comprises receiving, by a memory controller of the processing circuitry, the plurality of commands through the port;

segmenting each of the received commands into a plurality of segments comprises segmenting, by the memory controller, each of the received commands into a plurality of segments;

transmitting each segment of each plurality of segments to a respective data structure instantiation corresponding to the port ID of the respective received command comprises transmitting, by the memory controller, each segment of each plurality of segments to a respective data structure instantiation corresponding to the port ID of the respective received command; and performing data transfers for each respective segment of the plurality of segments by accessing the memory of the device at each respective memory address associated with each respective segment comprises performing, by the memory controller, data transfer for each respective segment of the plurality of segments by accessing the memory of the device at each respective memory address associated with each respective segment.

18. The method of claim 17, wherein the memory controller is a direct memory access (DMA) controller.

19. The method of claim 11, wherein receiving the plurality of commands through the port the processing circuitry comprises fetching each command of the plurality of commands through the bus from at least one submission queue of the interposer, wherein each of the at least one submission queue temporarily stores commands received from the at least two hosts.

20. The method of claim 11, wherein the respective port ID of each command of the plurality of commands corresponds to one of the at least two hosts.

21. The method of claim 11, wherein the method further comprises:
performing data transfers for a first subset of segments of a first command by accessing the memory of the device at each respective memory address associated with each respective segment of the first subset of segments; and
performing data transfers for a second subset of segments of a second command by accessing the memory of the device at each respective memory address associated with each respective segment of the second subset of segments.

22. A non-transitory computer-readable medium having instructions encoded thereon that, when executed, cause to be performed a method comprising:
receive a plurality of commands through a port, wherein the port is coupled to a bus, to which at least two hosts are communicatively coupled using an interposer, the plurality of commands are from the at least two hosts using the interposer and wherein each command of the plurality of commands comprises a respective memory address and a respective port identification (ID);
segment each of the received commands into a plurality of segments, each segment being of a predetermined transfer size;
transmit each segment of each plurality of segments to a respective data structure instantiation corresponding to the port ID of the respective received command; and
perform data transfers for each respective segment of the plurality of segments by accessing memory of the non-transitory computer-readable medium at each respective memory address associated with each respective segment.

* * * * *